(12) United States Patent
Chaplin et al.

(10) Patent No.: US 10,954,379 B2
(45) Date of Patent: Mar. 23, 2021

(54) POLYMERIC MATERIALS

(71) Applicant: Victrex Manufacturing Limited, Lancashire (GB)

(72) Inventors: Adam Chaplin, Lancashire (GB); Ulutan Tahsin, Lancashire (GB)

(73) Assignee: Victrex Manufacturing Limited, Lancashire (GB)

( * ) Notice: Subject to any disclaimer, the term of this patent is extended or adjusted under 35 U.S.C. 154(b) by 130 days.

(21) Appl. No.: 15/762,336

(22) PCT Filed: Sep. 26, 2016

(86) PCT No.: PCT/GB2016/052990
§ 371 (c)(1),
(2) Date: Mar. 22, 2018

(87) PCT Pub. No.: WO2017/051202
PCT Pub. Date: Mar. 30, 2017

(65) Prior Publication Data
US 2018/0282542 A1 Oct. 4, 2018

(30) Foreign Application Priority Data

Sep. 24, 2015 (GB) .................................... 1516943

(51) Int. Cl.
| | | |
|---|---|---|
| *C08L 71/00* | (2006.01) | |
| *C08G 65/40* | (2006.01) | |
| *B33Y 70/00* | (2020.01) | |
| *B29C 64/118* | (2017.01) | |

(52) U.S. Cl.
CPC .............. *C08L 71/00* (2013.01); *B33Y 70/00* (2014.12); *C08G 65/4012* (2013.01); *B29C 64/118* (2017.08); *C08G 2650/40* (2013.01); *C08L 2205/02* (2013.01); *C08L 2205/03* (2013.01)

(58) Field of Classification Search
CPC .. C08L 71/00; C08L 2205/02; C08L 2205/03; B33Y 70/00; C08G 65/4012; C08G 2650/40; B29C 64/106; B29C 64/00; B29K 2071/00
USPC ........................................................ 524/415
See application file for complete search history.

(56) References Cited

U.S. PATENT DOCUMENTS

| | | | | |
|---|---|---|---|---|
| 4,717,761 | A * | 1/1988 | Staniland | ........... C08G 65/4093 528/125 |
| 2003/0004600 | A1* | 1/2003 | Priedeman, Jr. | ....... B33Y 40/00 700/119 |
| 2011/0079936 | A1* | 4/2011 | Oxman | ................... B29C 48/92 264/176.1 |
| 2013/0037256 | A1* | 2/2013 | Blair | ...................... E21B 29/00 166/55.7 |
| 2013/0170171 | A1 | 7/2013 | Wicker et al. | |
| 2014/0134335 | A1* | 5/2014 | Pridoehl | ................ B33Y 30/00 427/256 |
| 2015/0251353 | A1 | 9/2015 | Rodgers et al. | |
| 2016/0281267 | A1* | 9/2016 | Wetzel | ..................... D01F 8/00 |

FOREIGN PATENT DOCUMENTS

| | | |
|---|---|---|
| CN | 101864162 A | 10/2010 |
| CN | 102337018 A | 2/2012 |
| EP | 0 184 458 A2 | 6/1986 |
| EP | 2510896 A1 | 10/2012 |
| GB | 2495624 A | 4/2013 |
| GB | 2535555 A | 8/2016 |
| WO | 2010019463 A1 | 2/2010 |
| WO | WO 2013/054114 A1 | 4/2013 |
| WO | 2014075185 A1 | 5/2014 |
| WO | WO 2014/072147 A1 | 5/2014 |
| WO | 2014207458 A1 | 12/2014 |
| WO | 2015086029 A1 | 6/2015 |
| WO | WO 2015/081009 A1 | 6/2015 |
| WO | 2015124903 A1 | 8/2015 |

OTHER PUBLICATIONS

International Search Report and Written Opinion for Application No. PCT/GB2016/052990 dated Dec. 14, 2016.
Search Report from United Kingdom Intellectual Property Office for Application No. 1516943.6 dated Jul. 7, 2016.
Search Report from United Kingdom Intellectual Property Office for Application No. 1616309.9 dated Oct. 31, 2016.
Ultem Resin 9085, 2020, Chemistry That Matters, 1-2.
Wu et al., "Influence of Layer Thickness and Raster Angle on the Mechanical Properties of 3D-Printed PEEK and a Comparative Mechanical Study between PEEK and ABS," 2015, Materials 8, 5834-5846.

* cited by examiner

*Primary Examiner* — Doris L Lee
(74) *Attorney, Agent, or Firm* — Casimir Jones, S.C.; Anne M. Reynolds

(57) ABSTRACT

A process for manufacturing an object, the process comprising steps: a) selecting a feedstock material comprising one or more polymeric material selected from i) a polymeric material (A) having a repeat unit of formula I and a repeat unit of formula II wherein Ph represents a phenylene moiety; and/or ii) a polymeric material (B) having a repeat unit of formula III and a repeat unit of formula IV wherein Ph represents a phenylene moiety; each X independently represents an oxygen or suphur atom; n represents an integer of 1 or 2; Y is selected from a phenylene moiety, a Ph-Ph moiety and a naphthalenyl moiety; W is a carbonyl group, an oxygen or sulphur atom, Z is selected from —X-Ph-S02-Ph- —X-Ph-S02-Y-S02-Ph- and —CO-Ph-; b) melting the feedstock material; and c) extruding the feedstock material to form a plurality of parts that define the object.

20 Claims, 1 Drawing Sheet

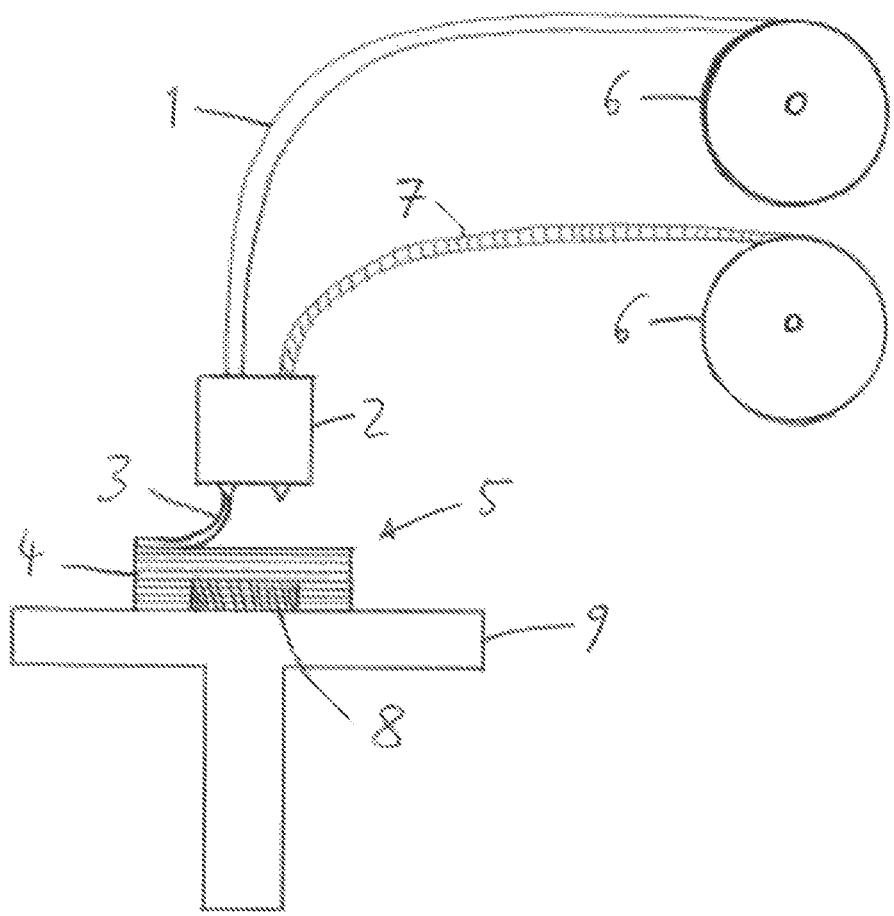

POLYMERIC MATERIALS

This invention relates to a process for manufacturing an object by heating and extruding a feedstock material comprising a polymeric material. The invention also concerns an object manufactured by said process and an apparatus for carrying out said process.

Processes that involve the direct and rapid conversion of three-dimensional CAD data to objects are known as rapid prototyping or rapid manufacturing processes. A common approach named Additive Manufacturing (AM) concerns the step-wise (often layer-wise) construction of an object from a shapeless material or a material that is neutral with respect to shape. Typically a three-dimensional model of an object to be fabricated is provided to an apparatus (e.g. a 3D printer), which then autonomously fabricates the object by gradually depositing, or otherwise forming, the constituent material in the shape of the object to be fabricated. Successive parts (e.g. layers) of material that represent cross-sections of the object may be deposited or otherwise formed; generally, the deposited parts/layers of material fuse (or otherwise solidify) to form the final object.

One such technique is Fused Deposition Modelling (FDM), also known as fused filament fabrication (FFF), as shown in FIG. 1, in which generally a feedstock material 1 is fed into a heated print-head 2, which may be movable in a number of different directions, and then extruded in molten form 3 to print a part (e.g. a layer) of build material 4. The stepwise addition of further layers can occur continuously until the desired three-dimensional object 5 has been created. The feedstock material 2 may be in the form of a filament on a reel 6 and in some cases two different filaments may be simultaneously melted and then printed selectively. For instance, one of the filaments may comprise a support material 7 which is needed only at locations above which an overhanging part of the three-dimensional object 5 is printed and requires support during the subsequent printing procedure. The extruded support material 8 can be removed subsequently, e.g. via dissolution in acids, bases or water. The build material 4 forms the actual three-dimensional object 5. The extrusion is carried out on a build platform 9 which may be movable in several different directions. There are a number of processes related to FDM that employ slight modifications, for example melted extrusion manufacturing (MEM) or selective deposition modeling (SDM).

Whilst FDM is advantageous in terms of its economic use of materials, it would be beneficial to provide process improvements such as better adhesion between adjacent layers of extruded material. In order to build up a three-dimensional component with good mechanical strength, it is necessary to adequately fuse together successive layers/parts of material. However, poor adhesion between adjacent layers can result, in particular in the "z" or vertical direction (i.e. where an upper layer is extruded on top of a lower layer) because the lower layer has had longer to cool down (and therefore harden) when compared with adhesion of the lower layer to adjacent layers in the horizontal ("x" and "y") directions.

According to a first aspect of the present invention there is provided a process for manufacturing an object, the process comprising the following steps:

a) selecting a feedstock material comprising one or more polymeric material selected from:

i) a polymeric material (A) having a repeat unit of formula

—O-Ph-O-Ph-CO-Ph-        I and a repeat unit of formula

—O-Ph-Ph-O-Ph-CO-Ph        II wherein Ph represents a phenylene moiety; and/or ii) a polymeric material (B) having a repeat unit of formula —X-Ph-(X-Ph-)$_n$X-Ph-CO-Ph-        III and a repeat unit of formula —X—Y—W-Ph-Z—        IV wherein Ph represents a phenylene moiety; each X independently represents an oxygen or sulphur atom; n represents an integer of 1 or 2; Y is selected from a phenylene moiety, a -Ph-Ph moiety and a naphthalenyl moiety; W is a carbonyl group, an oxygen or sulphur atom, Z is selected from —X-Ph-SO$_2$-Ph- —X-Ph-SO$_2$—Y—SO$_2$-Ph- and —CO-Ph-;

b) melting the feedstock material; and c) extruding the feedstock material to form a plurality of parts that define the object.

The process according to the present invention, which utilises copolymers containing either 1) poly-(ether-phenyl-ether-phenyl-carbonyl-phenyl)-(i.e. polyetheretherketone, PEEK) and poly-(ether-phenyl-phenyl-ether-phenyl-carbonyl-phenyl)- (i.e. polyetherdiphenyletherketone, PEDEK), 2) poly-(ether-phenyl-ether-phenyl-ether-phenyl-carbonyl-phenyl)- (i.e. polyetheretheretherketone, PEEEK) and PEDEK or 3) PEEEK and poly-(ether-phenyl-ether-phenyl-ether-phenyl-sulphonyl-phenyl)- (i.e. polyetheretherether-sulphone, PEEES), was surprisingly found to provide improved adhesion between the parts that define the object.

Therefore an object manufactured by the process of the present invention exhibits enhanced mechanical strength.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

References herein such as "in the range x to y" are meant to include the interpretation "from x to y" and so include the values x and y.

In some embodiments preferably the feedstock material comprises at least 60 wt % said polymeric material (A) and/or said polymeric material (B), more preferably at least 70 wt %, even more preferably at least 80 wt %, most preferably at least 90 wt %. In some embodiments preferably the feedstock material comprises at most 99.9 wt % said polymeric material (A) and/or said polymeric material (B), more preferably at most 99 wt %, more preferably at most 95 wt %, even more preferably at most 92 wt %, most preferably at most 90 wt %. These preferred values enable further improvements in the mechanical properties of the manufactured object.

In some preferred embodiments said feedstock material may consist essentially of polymeric material (A) and/or said polymeric material (B). In other preferred embodiments said feedstock material may consist of polymeric material (A) and/or said polymeric material (B).

In some preferred embodiments the one or more polymeric material is polymeric material (A).

The following features are applicable to polymeric material (A):

Preferably, in polymeric material (A), the following relationship applies:

$$\log_{10}(X\ \%) > 1.50 - 0.26\ MV;$$

wherein X % refers to the % crystallinity measured as described in Example 31 of WO2014207458A1 incorporated herein, and MV refers to the melt viscosity measured using capillary rheometry operating at 340° C. at a shear rate of 1000 s$^{-1}$ using a circular cross-section tungsten carbide die, 0.5 mm (capillary diameter)×3.175 mm (capillary length). The MV measurement is taken 5 minutes after the polymer has fully melted, which is taken to be 5 minutes after the polymer is loaded into the barrel of the rheometer.

The phenylene moieties (Ph) in each repeat unit may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. In many applications it is preferred for the polymeric material to be highly crystalline and, accordingly, the polymeric material preferably includes high levels of phenylene moieties with 1,4-linkages.

In a preferred embodiment, at least 95%, preferably at least 99%, of the number of phenylene moieties (Ph) in the repeat unit of formula I have 1,4-linkages to moieties to which they are bonded. It is especially preferred that each phenylene moiety in the repeat unit of formula I has 1,4-linkages to moieties to which it is bonded.

In a preferred embodiment, at least 95%, preferably at least 99%, of the number of phenylene moieties (Ph) in the repeat unit of formula II have 1,4-linkages to moieties to which they are bonded. It is especially preferred that each phenylene moiety in the repeat unit of formula II has 1,4-linkages to moieties to which it is bonded.

Preferably, the phenylene moieties in repeat unit of formula I are unsubstituted. Preferably, the phenylene moieties in repeat unit of formula II are unsubstituted.

Said repeat unit of formula I suitably has the structure

V

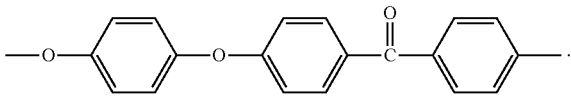

Said repeat unit of formula II suitably has the structure

VI

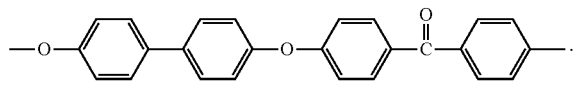

Preferred polymeric materials (A) in accordance with the invention have a crystallinity which is greater than expected from the prior art. Preferably, $\log_{10}(X\ \%) > 1.50 - 0.23\ MV$. More preferably $\log_{10}(X\ \%) > 1.50 - 0.28\ MV + 0.06\ MV^2$.

Preferably the repeat units I and II are in the relative molar proportions I:II of from 50:50 to 95:5, more preferably of from 60:40 to 95:5, most preferably of from 65:35 to 95:5, e.g. 75:25.

Said polymeric material (A) may include at least 50 mol %, preferably at least 60 mol % of repeat units of formula I. Particular advantageous polymeric materials (A) may include at least 62 mol %, or, especially, at least 64 mol % of repeat units of formula I. Said polymeric material (A) may include less than 90 mol %, suitably 82 mol % or less of repeat units of formula I. Said polymeric material (A) may include 58 to 82 mol %, preferably 60 to 80 mol %, more preferably 62 to 77 mol % of units of formula I.

Said polymeric material (A) may include at least 10 mol %, preferably at least 18 mol %, of repeat units of formula II. Said polymeric material (A) may include less than 42 mol %, preferably less than 39 mol % of repeat units of formula II. Particularly advantageous polymeric materials (A) may include 38 mol % or less; or 36 mol % or less of repeat units of formula II. Said polymeric material (A) may include 18 to 42 mol %, preferably 20 to 40 mol %, more preferably 23 to 38 mol % of units of formula II.

The sum of the mol % of units of formula I and II in said polymeric material (A) is suitably at least 95 mol %, is preferably at least 98 mol %, is more preferably at least 99 mol % and, especially, is about 100 mol %.

The ratio defined as the mol % of units of formula I divided by the mol % of units of formula II may be in the range 1.4 to 5.6, is suitably in the range 1.6 to 4 and is preferably in the range 1.8 to 3.3.

The Tm of said polymeric material (A) (suitably measured as described herein) may be less than 330° C., is suitably less than 320° C., is preferably less than 310° C. In some embodiments, the Tm may be less than 306° C. The Tm may be greater than 280° C., or greater than 290° C., 295° C. or 300° C. The Tm is preferably in the range 300° C. to 310° C.

The Tg of said polymeric material (A) (suitably measured as described herein) may be greater than 130° C., preferably greater than 135° C., more preferably 140° C. or greater. The Tg may be less than 175° C., less than 165° C., less than 160° C. or less than 155° C. The Tg is preferably in the range 145° C. to 155° C.

The difference (Tm-Tg) between the Tm and Tg may be at least 130° C., preferably at least 140° C., more preferably at least 150° C. The difference may be less than 170° C. or less than 165° C. In a preferred embodiment, the difference is in the range 145-165° C.

In a preferred embodiment, said polymeric material (A) has a Tg in the range 145° C.–155° C., a Tm in the range 300° C. to 310° C. and the difference between the Tm and Tg is in the range 145° C. to 165° C.

Said polymeric material (A) may have a crystallinity of at least 5%, preferably at least 10%, more preferably at least 15%, even more preferably at least 20%, even more preferably at least 23%, most preferably at least 25%, measured as described in Example 31 of WO2014207458A1 incorporated herein.

Said polymeric material (A) suitably has a melt viscosity (MV) of at least 0.09 kNsm$^{-2}$ preferably has a MV of at least 0.15 kNsm$^{-2}$, more preferably at least 0.20 kNsm$^{-2}$, especially at least 0.25 kNsm$^{-2}$. MV is suitably measured using capillary rheometry operating at 340° C. at a shear rate of 1000 s$^{-1}$ using a tungsten carbide die, 0.5 mm×3.175 mm. Said polymeric material (A) may have a MV of less than 1.8 kNsm$^{-2}$, suitably less than 1.2 kNsm$^{-2}$, preferably less than 0.8 kNsm$^{-2}$, most preferably less than 0.7 kNsm$^{-2}$.

Said polymeric material (A) may have a tensile strength, measured in accordance with ISO527 of at least 40 MPa, preferably at least 60 MPa, more preferably at least 80 MPa. The tensile strength is preferably in the range 80-110 MPa, more preferably in the range 80-100 MPa.

Said polymeric material (A) may have a flexural strength, measured in accordance with ISO178 of at least 130 MPa. The flexural strength is preferably in the range 135-180 MPa, more preferably in the range 140-150 MPa.

Said polymeric material (A) may have a flexural modulus, measured in accordance with ISO178 of at least 2 GPa, preferably at least 3 GPa. The flexural modulus is preferably in the range 3.0-4.5 GPa, more preferably in the range 3.0-4.0 GPa.

The Following Features are Applicable to Polymeric Material (B):

The phenylene moieties in each repeat unit may independently have 1,4-linkages to atoms to which they are bonded or 1,3-linkages. Where a phenylene moiety includes 1,3-linkages, the moiety will be in amorphous phases of the polymer. Crystalline phases will include phenylene moieties with 1,4-linkages. In many situations it is preferred for the polymeric material to be crystalline and, accordingly, said polymeric material preferably includes phenylene moieties with 1,4-linkages.

In a preferred embodiment, each Ph moiety in the repeat unit of formula III has 1,4-linkages to moieties to which it is bonded.

In a preferred embodiment, each Ph moiety in the repeat unit of formula IV has 1,4-linkages to moieties to which it is bonded.

In repeat unit III, each X preferably represents an oxygen atom.

Preferably, n represents 1.

In repeat unit III, preferably each phenylene moiety has 1,4-linkages to atoms to which it is bonded.

In repeat unit IV, each X preferably represents an oxygen atom.

Preferably, Y is selected from a phenylene moiety and a -Ph-Ph- moiety, wherein each Ph moiety in said -Ph-Ph- includes 1,4-linkages. More preferably, Y is a -Ph-Ph- moiety wherein each phenylene moiety has 1,4-linkages.

Preferably, W represents an oxygen atom.

Preferably, Z is —CO-Ph-, suitably wherein Ph has 1,4-linkages.

In a preferred embodiment, said repeat unit of formula III has the structure:

VII

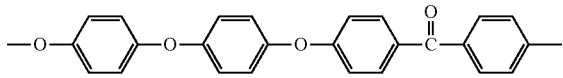

and said repeat unit of formula IV has the structure:

VI

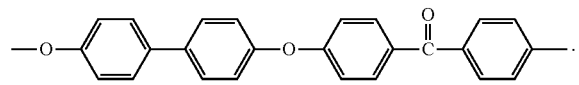

The Tm of said polymeric material (B) may be less than 298° C., alternatively less than 296° C., is suitably less than 293° C., is preferably less than 290° C. In some embodiments, the Tm may be less than 287° C. or less than 285° C. The Tm may be greater than 270° C., or greater than 275° C., 280° C. or 285° C. The Tm is preferably in the range 280° C. to 295° C.

The Tg of said polymeric material (B) may be greater than 120° C., preferably greater than 130° C., more preferably 133° C. or greater. The Tg may be less than 175° C., less than 150° C., less than 140° C. or less than 130° C. The Tg is preferably in the range 130° C. to 140° C.

The difference (Tm-Tg) between the Tm and Tg may be at least 130° C., preferably at least 140° C., more preferably at least 150° C. The difference may be less than 170° C. or less than 161° C. In a preferred embodiment, the difference is in the range 150-160° C.

In a preferred embodiment, said polymeric material (B) has a Tg in the range 130° C.-140° C., a Tm in the range 285° C. to 292° C. and the difference between the Tm and Tg is in the range 150° C. to 161° C.

Said polymeric material (B) may have a crystallinity, measured as described in Example 31 of WO2014207458A1 incorporated herein, of at least 10%, preferably at least 20%, more preferably at least 25%. The crystallinity may be less than 50% or less than 40%.

Said polymeric material (B) suitably has a melt viscosity (MV) of at least 0.06 kNsm$^{-2}$, preferably has a MV of at least 0.08 kNsm$^{-2}$, more preferably at least 0.085 kNsm$^{-2}$, especially at least 0.09 kNsm$^{-2}$. MV is suitably measured using capillary rheometry operating at 400° C. at a shear rate of 1000 s$^{-1}$ using a tungsten carbide die, 0.5×3.175 mm. Said polymeric material (B) may have a MV of less than 1.00 kNsm$^{-2}$, suitably less than 0.5 kNsm$^{-2}$.

Said polymeric material may (B) have a tensile strength, measured in accordance with ASTM D790 of at least 40 MPa, preferably at least 60 MPa, more preferably at least 80 MPa. The tensile strength is preferably in the range 80-110 MPa, more preferably in the range 80-100 MPa.

Said polymeric material (B) may have a flexural strength, measured in accordance with ASTM D790 of at least 145 MPa. The flexural strength is preferably in the range 145-180 MPa, more preferably in the range 145-165 MPa.

Said polymeric material (B) may have a flexural modulus, measured in accordance with ASTM D790, of at least 2 GPa, preferably at least 3 GPa, more preferably at least 3.5 GPa. The flexural modulus is preferably in the range 3.5-4.5 GPa, more preferably in the range 3.5-4.1 GPa.

Said polymeric material (B) may include at least 50 mol %, preferably at least 60 mol %, more preferably at least 65 mol %, especially at least 70 mol % of repeat units of formula III. Particular advantageous polymeric materials (B) may include at least 72 mol %, or, especially, at least 74 mol % of repeat units of formula III. Said polymeric material (B) may include less than 85 mole %, suitably 80 mol % or less of repeat units of formula III. Said polymeric material (B) may include 68 to 82 mole %, preferably 70 to 80 mol %, more preferably 72 to 77 mol % of units of formula III.

Said polymeric material (B) may include at least 15 mol %, preferably at least 20 mol %, of repeat units of formula IV. Said polymeric material (B) may include less than 50 mol %, preferably less than 40 mol %, more preferably less than 35 mol %, especially less than 30 mol % of repeat units of formula IV. Particularly advantageous polymeric materials (B) may include 28 mol % or less; or 26 mol % or less. Said polymeric material (B) may include 18 to 32 mol %, preferably 20 to 30 mol %, more preferably 23 to 28 mol % of units of formula IV.

The sum of the mole % of units of formula III and IV in said polymeric material is suitably at least 95 mol %, is preferably at least 98 mol %, is more preferably at least 99 mol % and, especially, is about 100 mol %.

The ratio defined as the mole % of units of formula III divided by the mole % of units of formula IV may be in the range 1.8 to 5.6, is suitably in the range 2.3 to 4 and is preferably in the range 2.6 to 3.3.

The Following Features are Generally Applicable to the Present Invention:

The feedstock material may be a blend comprising or consisting essentially of thermoplastic polymers, for example one or more polymeric material selected from polymeric material (A) and/or polymeric material (B) and one or more further thermoplastic polymer(s). Preferably said blend is a miscible polymer blend (i.e. a homogenous polymer blend). Preferably said blend has been formed by melt processing.

Almost all polymers contract to some extent on cooling after solidification. With high melting semi-crystalline polymers such as PEEK, the structure of polymer can be "locked in" to a certain extent as the polymer crystallises from a melt. Residual stresses can therefore occur due to the extruded feedstock material being constrained from shrinking as it cools down. These residual stresses may manifest themselves as poor mechanical properties and/or poor dimensional stability (e.g. a misshapen component). However the use of a blend can help to reduce these residual stresses.

In some preferred embodiments the feedstock material may be a blend comprising 1) one or more polymeric material selected from polymeric material (A) and/or polymeric material (B), and 2) one or more polymeric material (C) having a repeat unit of formula (VIII)

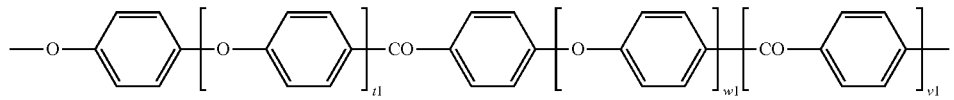

wherein t1 and w1 independently represent 0 or 1 and v1 represents 0, 1 or 2.

Advantageously, the use of such a blend in the method of the present invention affords an object that can exhibit high fracture toughness in combination with high crystallinity.

The level of crystallinity in said polymeric material (C) (measured as described in Example 31 of WO2014207458A1 incorporated herein) may be at least 15%, suitably at least 20%, preferably at least 25% and, more preferably, at least 30%. In especially preferred embodiments, the crystallinity may be greater than 30%, more preferably greater than 35%. The level of crystallinity may be less than 60%.

Said polymeric material (C) may have a repeat unit selected from a repeat unit VIII wherein t1=1, v1=0 and w1=0; t1=0, v1=0 and w1=0; t1=0, w1=1, v1=2; or t1=0, v1=1 and w1=0.

Polymeric material (C) more preferably has a repeat unit wherein t1=1, v1=0 and w1=0; or t1=0, v1=0 and w1=0. Polymeric material (C) more preferably has a repeat unit wherein t1=1, v1=0 and w1=0.

Polymeric material (C) suitably includes at least 50 mol %, (e.g. 50-100 mol %), preferably at least 60 mol % (e.g. 60-100 mol %), more preferably at least 80 mol % (e.g. 80 to 100 mol %), of repeat units of formula VIII, especially such units where t1=1, v1=0 and w1=0.

Polymeric material (C) suitably includes at least 50 wt % (e.g. 50-100 wt %) of repeat units of formula VIII.

Polymeric material (C) preferably consists essentially of a repeat unit of a formula VIII, especially such a repeat unit wherein t1=1, v1=0 and w1=0.

In preferred embodiments, said polymeric material (C) is selected from polyetheretherketone, polyetherketone, polyetherketoneetherketoneketone and/or polyetherketoneketone. In a more preferred embodiment, said polymeric material (C) is selected from polyetherketone and/or polyetheretherketone. In an especially preferred embodiment, said polymeric material (C) is polyetheretherketone.

Said polymeric material (C) preferably has a melt viscosity (MV) measured as described above at 340° C. of at least 0.06 kNsm-2, preferably has a MV of at least 0.08 kNsm-2, more preferably at least 0.085 kNsm-2, especially at least 0.09 kNsm-2. Said polymeric material (C) may have a MV of less than 1.00 kNsm-2, suitably less than 0.8 kNsm-2.

The difference between the MV of polymeric material (A) or polymeric material (B) and polymeric material (C) (all measured as described above) is preferably less than 0.3 kNsm-2, more preferably less than 0.15 kNsm-2.

Said blend comprising 1) one or more polymeric material selected from polymeric material (A) and/or polymeric material (B), and 2) one or more polymeric material (C) may have a crystallinity measured as described in Example 31 of WO2014207458A1 incorporated herein of at least 30% or preferably at least 33%.

Said blend comprising 1) one or more polymeric material selected from polymeric material (A) and/or polymeric material (B), and 2) one or more polymeric material (C) suitably define a combination (which is preferably a substantially homogenous mixture) which exhibits a single Tm and/or a single Tg. Preferably said blend is a miscible polymer blend. Preferably said blend has been formed by melt processing.

In the blend, the difference between the Tm and Tg may be in the range 155° C. to 185° C.

In the blend, the Tm is preferably less than 335° C. It may be in the range 310° C. to 335° C.

In the blend, the Tg is preferably greater than 148° C. It may be in the range 149° C. to 158° C.

Said feedstock material may have a crystallinity measured as described in Example 31 of WO2014207458A1 incorporated herein of at least 5%, preferably at least 10%, even more preferably at least 15%, even more preferably at least 20%, even more preferably at least 22%, even more preferably at least 24%. The crystallinity may be less than 30%.

Said feedstock material may have a tensile strength, measured in accordance with ISO527 (specimen type 1 b) tested at 23° C. at a rate of 50 mm/minute of at least 30 MPa, of at least 50 MPa, preferably at least 70 MPa. The tensile strength is preferably in the range 70-90 MPa.

Said feedstock material may have a tensile modulus, measured in accordance with ISO527 (ISO527-1a test bar, tested in uniaxial tension at 23° C. at a rate of 1 mm/minute), of at least 2 GPa, preferably at least 2.5 GPa. The tensile modulus is preferably in the range 2.5-4.1 GPa.

Said feedstock material may have a flexural strength, measured in accordance with ISO178 (80 mm×10 mm×4 mm specimen, tested in three-point-bend at 23° C. at a rate of 2 mm/minute), of at least 105 MPa. The flexural strength is preferably in the range 110-170 MPa, more preferably in the range 115-160 MPa.

Said feedstock material may have a flexural modulus, measured in accordance with ISO178 (80 mm×10 mm×4 mm specimen, tested in three-point-bend at 23° C. at a rate of 2 mm/minute), of at least 2 GPa, preferably at least 2.5 GPa. The flexural modulus is preferably in the range 2.5-4 GPa.

The feedstock material may have a Notched Izod Impact Strength (specimen 80 mm×10 mm×4 mm with a cut 0.25 mm notch (Type A), tested at 23° C., in accordance with ISO180) of at least 4 KJm$^{-2}$, preferably at least 5 KJm$^{-2}$, more preferably at least 10 KJm$^{-2}$, even more preferably at least 12 KJm$^{-2}$. The Notched Izod Impact Strength may be less than 50 KJm$^{-2}$, suitably less than 30 KJm$^{-2}$, more preferably less than 20 KJm$^{-2}$, most preferably less than 18 KJm$^{-2}$.

Said feedstock material suitably has a melt viscosity of less than 320 Pa·s, preferably less than 300 Pa·s, more preferably less than 290 Pa·s. MV is suitably measured using capillary rheometry operating at 340° C. at a shear rate of 1000 s−1 using a tungsten carbide die, 0.5 mm×3.175 mm.

The difference between the MV of said feedstock material and said polymeric material (A) or said polymeric material (B) is preferably at least 30 Pa·s.

The crystallinity of said feedstock material minus the crystallinity of said polymeric material (A) or said polymeric material (B) is suitably greater than minus 3, preferably greater than minus 2.

Said feedstock material may further include one or more polymeric material (D) having one or more repeat unit of formula

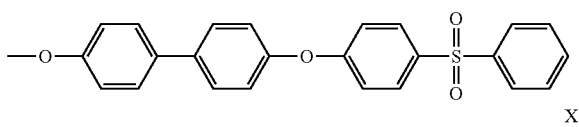

IX

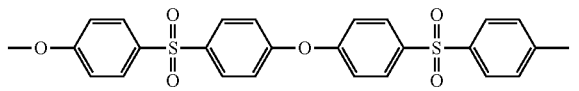

X

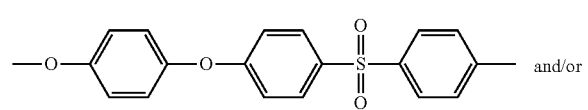

XI and/or

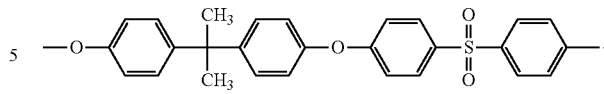

XII

Said polymeric material (D) may include at least 75 mol %, preferably at least 90 mol %, more preferably at least 99 mol %, especially at least 100 mol % of repeat units of formula IX, X, XI and/or XII.

Said polymeric material (D) may be a homopolymer or a copolymer, for example a random or block copolymer. When polymeric material (D) is a copolymer, it may include more than one repeat unit selected from formula IX, X, XI and/or XII.

In a preferred embodiment, polymeric material (D) includes said repeat unit of formula IX.

Said polymeric material (D) may have a melt flow rate (MFR) equal to or higher than 5 g/10 min at 365° C. and under a load of 5.0 kg, preferably equal to or higher than 10 g/10 min at 365° C. and under a load of 5.0 kg, more preferably equal to or higher than 14 g/10 min at 365° C. and under a load of 5.0 kg, as measured in accordance with ASTM method D1238; to measure said melt flow rate, a Tinius Olsen Extrusion Plastometer melt flow test apparatus can be used.

Said feedstock material may include 0 to 40 wt % of said polymeric material (D).

The feedstock material may be a blend comprising 1) one or more polymeric material selected from polymeric material (A) and/or polymeric material (B), and 2) polymeric material (D). Said blend may further comprise polymeric material (C).

The feedstock material may further include one or more of polyetherimide (PEI), Polyimide (PI), Polybenzimidazole (PBI), PolyEtherSulphone, PolySulphone (PSU), PolyPhenyleneSulphide (PPS), and/or PolyPhenyleneOxide (PPO). Said feedstock material may be a blend comprising 1) one or more polymeric material selected from polymeric material (A) and/or polymeric material (B), and 2) one or more of polyetherimide (PEI), Polyimide (PI), Polybenzimidazole (PBI), PolyEtherSulphone, PolySulphone (PSU), PolyPhenyleneSulphide (PPS), and/or PolyPhenyleneOxide (PPO).

In some embodiments, said feedstock material may further comprise one or more filler. Said filler may include a fibrous filler or a non-fibrous filler. Said filler may include both a fibrous filler and a non-fibrous filler. A said fibrous filler may be continuous or discontinuous. The incorporation of fillers is beneficial because it can reduce the level of shrinkage on solidification of the extruded feedstock material and also lower the amount of residual stress present in the manufactured object.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre. A fibrous filler may comprise nanofibers.

A said non-fibrous filler may be selected from mica, silica, talc, HydroxyApatite (or HydroxylApatite), alumina, kaolin, calcium sulfate, calcium carbonate, titanium oxide, titanium dioxide, zinc sulphide, ferrite, clay, glass powder, zinc oxide, nickel carbonate, iron oxide, quartz powder, magnesium carbonate, fluorocarbon resin, graphite, carbon powder, nanotubes and/or barium sulphate. The non-fibrous fillers may be introduced in the form of powder or flaky particles.

Preferably, said filler comprises one or more fillers selected from glass fibre, carbon fibre, aramid fibres, carbon black and a fluorocarbon resin. More preferably, said filler comprises glass fibre or carbon fibre. Such filler preferably comprises glass fibre.

The feedstock material as described may include at least 40 wt %, or at least 50 wt % of filler. Said composite material may include 70 wt % or less or 60 wt % or less of filler.

In some embodiments preferably the plurality of parts that define the object comprises one or more parts that include one or more filler. Said plurality of parts may comprise at least some parts in which the percentage weight of filler present in each part is different. Such an arrangement can help to avoid deformation of the object at potential weak points. Said plurality of parts that define the object may comprise at least some parts in which the percentage weight of filler present in each part varies gradually with each successive neighbouring part. In the context of the present invention neighbouring parts are two parts that are in contact with each other. Said plurality of parts may comprise at least some parts that alternate in succession between a part that does not contain a filler and a neighbouring part that does contain one or more fillers.

In some embodiments said feedstock material may preferably further comprise one or more antioxidants, such as a phenolic antioxidant (e.g. Octadecyl-3-(3,5-di-tert.butyl-4-hydroxyphenyl)-propionate), an organic phosphite antioxidant (e.g. tris(2,4-di-tert-butylphenyl)phosphite) and/or a secondary aromatic amine antioxidant. In some preferred embodiments said feedstock material may comprise polymeric material (A) and/or polymeric material (B), and one or more antioxidant. Said feedstock material may additionally comprise polymeric material (C). In some preferred embodiments said feedstock material may consist of polymeric material (A) and/or polymeric material (B), and one or more antioxidant. In other preferred embodiments said feedstock material may consist of polymeric material (A) and/or polymeric material (B), polymeric material (C), and one or more antioxidant.

In some embodiments, said feedstock material may further comprise one or more of stabilizers such as light stabilizers and heat stabilizers, processing aids, pigments, UV absorbers, lubricants, plasticizers, flow modifiers, flame retardants, dyes, colourants, anti-static agents, extenders, metal deactivators, conductivity additives such as carbon black and/or carbon nanofibrils.

Said feedstock material may define a composite material which could be prepared as described in Impregnation Techniques for Thermoplastic Matrix Composites. A Miller and A G Gibson, Polymer & Polymer Composites 4(7), 459-481 (1996), EP102158 and EP102159, the contents of which are incorporated herein by reference. Preferably, in the method, said polymeric material (A) and/or polymeric material (B) and said filler means are mixed at an elevated temperature, suitably at a temperature at or above the melting temperature of said polymeric material (A) and/or polymeric material (B). Thus, suitably, said composition and filler means are mixed whilst the polymeric material (A) and/or polymeric material (B) is molten. Said elevated temperature is suitably below the decomposition temperature of the polymeric material (A) and/or polymeric material (B). Said elevated temperature is preferably at or above the main peak of the melting endotherm (Tm) for said polymeric material (A) and/or polymeric material (B). Said elevated temperature is preferably at least 300° C. Advantageously, the molten polymeric material (A) and/or polymeric material (B) can readily wet the filler and/or penetrate consolidated fillers, such as fibrous mats or woven fabrics, so the composite material prepared comprises the composition and filler means which is substantially uniformly dispersed throughout the composition.

The composite material may be prepared in a substantially continuous process. In this case the polymeric material (A) and/or polymeric material (B) and filler means may be constantly fed to a location wherein they are mixed and heated. An example of such a continuous process is extrusion. Another example (which may be particularly relevant wherein the filler means comprises a fibrous filler) involves causing a continuous filamentous mass to move through a melt or aqueous dispersion comprising said composition. The continuous filamentous mass may comprise a continuous length of fibrous filler or, more preferably, a plurality of continuous filaments which have been consolidated at least to some extent. The continuous fibrous mass may comprise a tow, roving, braid, woven fabric or unwoven fabric. The filaments which make up the fibrous mass may be arranged substantially uniformly or randomly within the mass. A composite material could be prepared as described in PCT/GB2003/001872, U.S. Pat. No. 6,372,294 or EP1215022.

Alternatively, the composite material may be prepared in a discontinuous process. In this case, a predetermined amount of said composition and a predetermined amount of said filler means may be selected and contacted and a composite material prepared by causing the polymeric material (A) and/or polymeric material (B) to melt and causing said polymeric material and filler means to mix to form a substantially uniform composite material.

Preferably the process is a fused deposition modelling process (i.e. preferably the process is a fused filament fabrication process). Preferably, prior to step b), the feedstock material is fed into a printing head and the subsequent melting of the feedstock material in step b) occurs in said printing head. In some embodiments, prior to step b), the feedstock material is fed into a nozzle of a printing head and the subsequent melting of the feedstock material in step b) occurs in said nozzle. Preferably the feedstock material is extruded from a printing head, more preferably a nozzle of a printing head. The feedstock material may be fed into more than one printing head. Preferably the feedstock material is heated prior to entering the printing head. Step c) may comprise extrusion from more than one printing head. An apparatus for performing the process of the first aspect may comprise a control unit configured for controlling said apparatus. Said control unit may be configured to control said apparatus such that said apparatus is capable of extruding material in accordance with a predetermined digital representation of the object.

In step b) the feedstock material may preferably be heated to at least 280° C., more preferably at least 290° C., even more preferably at least 295° C., most preferably at least 300° C., but preferably at most 370° C., more preferably at most 360° C., even more preferably at most 350° C. In step b) the feedstock material may preferably be heated for a duration of at least 1 second, more preferably at least 5 seconds, even more preferably at least 10 seconds, even more preferably at least 20 seconds, most preferably at least 30 seconds, but preferably at most 5 min, more preferably at most 3 min, even more preferably at most 2 min, most preferably at most 1 min.

Preferably the feedstock material is in the form of a filament prior to melting in step b). Prior to melting in step b) said filament may be provided by a supply means to an apparatus for performing the process of the first aspect. Said filament may be provided on a rotatable spool. Said rotatable spool may form part of a cassette. Said cassette may be arranged to be inserted into an apparatus for performing the process of the first aspect.

Said filament may preferably have a diameter of at least 0.5 mm, more preferably at least 1 mm, even more preferably at least 1.5 mm, most preferably at least 1.7 mm; but preferably at most 5 mm, more preferably at most 3 mm, more preferably at most 2 mm, most preferably 1.9 mm.

Preferably the plurality of parts comprises a plurality of layers that define the object.

In some preferred embodiments a support material may be simultaneously or alternately extruded with the feedstock material to define an object with said support material. The object may have overhanging portions and therefore it is desirable to support such portions during manufacture of the object. Said support material may form a three-dimensional support structure for the object. Said support material may be extruded such that the support material is positioned at least partially below an overhanging portion of the object. References to the position of the support material and overhanging portions of the object are with reference to the position of the object and/or portions thereof during manufacture of the object. Preferably the support material is soluble in one or more solvents such as water. Preferably the support material comprises one or more metal oxide, such as one or more of $SiO_2$, CaO, $Na_2O$ and/or $P_2O_5$. Once the object with said support material has been manufactured the support material may be removed from the object by dissolving said support material in a suitable solvent. The support material may be extruded from a printing head, preferably a nozzle of a printing head. Said support material and said feedstock material may be extruded from one or more nozzle. Preferably said support material and said feedstock material are extruded from different nozzles.

Preferably the feedstock material is simultaneously or alternately extruded with a second material. Said second material may preferably comprise polymeric material (C). Preferably the feedstock material and/or said second material are in the form of one or more filament prior to melting in step b). Preferably the feedstock material and said second material are in the form of separate filaments prior to melting in step b). The second material may be extruded from a printing head, preferably a nozzle of a printing head. In some preferred embodiments the feedstock material and the second material are extruded from a nozzle, preferably the same nozzle.

In some preferred embodiments wherein the feedstock material and/or second material are in the form of a filament prior to melting in step b), the filament of the feedstock material and/or the filament of the second material may have been obtained by quenching a molten form of said filament of the feedstock material and/or said filament of the second material. In the context of this embodiment the term "quenching" means cooling the molten filament at an enhanced rate in comparison with the cooling that would occur under ambient conditions, e.g. the molten filament may be cooled to a solid form in less than 5 min, preferably less than 2 min, more preferably less than 1 min, even more preferably less than 30 seconds, most preferably less than 10 seconds. The quenching may occur using a medium comprising one or more of water, brine, caustic soda, aqueous polymers, oils, molten salts, air, nitrogen, argon, and/or helium. Quenching can reduce crystallinity which can increase the hardness of the filament, and may widen the temperature window in which the filament can then subsequently be processed.

According to a second aspect of the present invention there is provided an object manufactured in accordance with the process of the first aspect.

According to a third aspect of the present invention there is provided an object manufactured by fused deposition modelling wherein said object comprises one or more polymeric material selected from:

i) a polymeric material (A) having a repeat unit of formula

—O-Ph-O-Ph-CO-Ph-                I and a repeat unit of formula

—O-Ph-Ph-O-Ph-CO-Ph              II wherein Ph represents a phenylene moiety; and/or ii) a polymeric material (B) having a repeat unit of formula

—X-Ph-(X-Ph-)$_n$X-Ph-CO-Ph-     III and a repeat unit of formula

—X—Y—W-Ph-Z—                     IV wherein Ph represents a phenylene moiety; each X independently represents an oxygen or sulphur atom; n represents an integer of 1 or 2; Y is selected from a phenylene moiety, a -Ph-Ph moiety and a naphthalenyl moiety; W is a carbonyl group, an oxygen or sulphur atom, Z is selected from

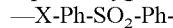
—X-Ph-SO$_2$-Ph-
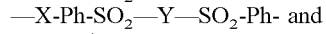
—X-Ph-SO$_2$—Y—SO$_2$-Ph- and
—CO-Ph-.

According to a fourth aspect of the present invention there is provided an apparatus for performing the process of the first aspect comprising one or more melting means and one or more extrusion means.

Said melting means and/or said extrusion means may comprise one or more printing head, preferably one or more nozzle of one or more printing head. Preferably the apparatus comprises a plurality of printing heads and/or a plurality of nozzles. Said one or more extrusion means may further comprise means for directing the extrusion of one or more material from said extrusion means. Said means for directing the extrusion preferably comprises a carriage mechanism. Preferably said carriage mechanism is supported on a gantry. Said apparatus may further comprise a supply means for enabling ease of supply of feedstock material to the apparatus. Said supply means may comprise a conveyor and/or rotatable spool mechanism. Said apparatus may comprise a control unit configured for controlling said apparatus. Said control unit may be configured to control said apparatus such that said apparatus is capable of extruding material in accordance with a predetermined digital representation of the object.

According to a fifth aspect of the present invention there is provided the use of a feedstock material comprising one or more polymeric material selected from:

i) a polymeric material (A) having a repeat unit of formula

—O-Ph-O-Ph-CO-Ph-                I and a repeat unit of formula

—O-Ph-Ph-O-Ph-CO-Ph              II wherein Ph represents a phenylene moiety; and/or ii) a polymeric material (B) having a repeat unit of formula

—X-Ph-(X-Ph-)$_n$X-Ph-CO-Ph-     III and a repeat unit of formula

—X—Y—W-Ph-Z—   IV wherein Ph represents a phenylene moiety; each X independently represents an oxygen or sulphur atom; n represents an integer of 1 or 2; Y is selected from a phenylene moiety, a -Ph-Ph moiety and a naphthalenyl moiety; W is a carbonyl group, an oxygen or sulphur atom, Z is selected from
—X-Ph-SO$_2$-Ph-
—X-Ph-SO$_2$—Y—SO$_2$-Ph- and
—CO-Ph-
in a fused deposition modelling process to increase the adhesion between parts that define an object.

According to a sixth aspect of the present invention there is provided the use of the object according to the second or third aspects, or manufactured according to the first aspect, in automotive, aerospace, medical, electronic, oil and/or gas applications.

In the context of the present invention, the Glass Transition Temperature (Tg), the Cold Crystallisation Temperature (Tn), the Melting Temperature (Tm) and Heat of Fusions of Nucleation (ΔHn) and Melting (ΔHm) are determined using the following DSC method:

A dried sample of a polymer is compression moulded into an amorphous film, by heating 7 g of polymer in a mould at 400° C. under a pressure of 50 bar for 2 minutes, then quenching in cold water producing a film of dimensions 120×120 mm, with a thickness in the region of 0.20 mm. A 8 mg plus or minus 3 mg sample of each film is scanned by DSC as follows:

Step 1 Perform and record a preliminary thermal cycle by heating the sample from 30° C. to 400° C. at 20° C./min.
Step 2 Hold for 5 minutes.
Step 3 Cool at 20° C./min to 30° C. and hold for 5 mins.
Step 4 Re-heat from 30° C. to 400° C. at 20° C./min, recording the Tg, Tn, Tm, ΔHn and ΔHm.

From the DSC trace resulting from the scan in step 4, the onset of the Tg is obtained as the intersection of the lines drawn along the pre-transition baseline and a line drawn along the greatest slope obtained during the transition. The Tn is the temperature at which the main peak of the cold crystallisation exotherm reaches a maximum. The Tm is the temperature at which the main peak of the melting endotherm reaches a maximum.

The Heats of Fusion for Nucleation (ΔHn) and Melting (ΔHm) are obtained by connecting the two points at which the cold crystallisation and melting endotherm(s) deviate from the relatively straight baseline. The integrated areas under the endotherms as a function of time yield the enthalpy (mJ) of the particular transition, the mass normalised Heats of Fusion are calculated by dividing the enthalpy by the mass of the specimen (J/g).

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Specific embodiments of the invention will now be described, by way of example, and with reference to the accompanying FIGURES in which:

FIG. 1 is a schematic view of a fused filament fabrication device.

EXAMPLES

Preparation of 0.5 Mol Polyetheretherketone (PEEK)-Polyetherdiphenyletherketone (PEDEK) Copolymer A 0.5 litre flanged flask fitted with a ground glass lid, stirrer/stirrer guide, nitrogen inlet and outlet was charged with 4,4'-difluorobenzophenone (111.29 g, 0.510 mol), 1,4-dihydroxybenzene (41.30 g, 0.375 mol), 4,4'-dihydroxydiphenyl (23.28 g, 0.125 mol) and diphenylsulphone (241.07 g) and purged with nitrogen for 1 hour. The contents were then heated under a nitrogen blanket to 160° C. to form an almost colourless solution. While maintaining a nitrogen blanket, dried sodium carbonate (53.00 g, 0.5 mol) and potassium carbonate (2.76 g, 0.02 mol), both sieved through a screen with a mesh size of 500 micrometers, were added. The temperature was raised to 185° C. at 1° C./min and held for 100 minutes. The temperature was raised to 205° C. at 1° C./min and held for 20 minutes. The temperature was raised to 315° C. at 1° C./min and held for approximately 60 minutes or until the desired MV was reached as indicated by the torque rise on the stirrer. The required torque rise was determined from a calibration graph of torque rise versus MV. The reaction mixture was then poured into a foil tray, allowed to cool, milled and washed with 2 litres of acetone and then with warm water at a temperature of 40-50° C. until the conductivity of the waste water was <2 μS. The resulting PEEK-PEDEK powder was dried in an air oven for 12 hours at 120° C.

The PEEK-PEDEK powder was converted into a PEEK-PEDEK filament by passing through a die at 400° C. using a single screw extruder. Comparative Ultem (trade mark) 9085 filament was prepared by similarly passing Ultem (trade mark) 9085 resin (available from Sabic (trade mark)) through a die at 400° C. using a single screw extruder.

Printing and Testing of Test Bars

Test bars were printed from the PEEK-PEDEK filament and from the Ultem (trade mark) 9085 filament on a Filament Fusion fabrication device (see FIG. 1 and page 1, paragraph 3 for details of the device), to ISO-527-1:2012, 1BA size specifications.

Test bars were printed in 2 geometries as follows:
1) Extrusion path is orientated parallel to the length of the bar such that the print head repeatedly moves along the length of the bar from one end of the bar to the other end while continuously printing the bar (parallel/X geometry).
2) Extrusion path is orientated perpendicular to the length of the bar such that the print head repeatedly moves along the width of the bar from one side of the bar to the other side while continuously printing the bar (perpendicular/Y geometry).

The test bars were printed with a nozzle temperature of 385° C. and a bed temperature of 185° C.

Two of the PEEK-PEDEK test bars were annealed at 200° C. for 2 hours in a circulating air oven to increase their crystallinity. The Ultem (trade mark) 9085 test bars were not annealed because the Ultem (trade mark) 9085 resin is by nature amorphous.

Tensile tests were performed on the test bars according to ISO 527-1:2012 and the results are shown in Table 1 below.

TABLE 1

Tensile test results for a number of inventive and comparative samples

| Material | Geometry of test bar printing | Tensile Strength (MPa) | Elongation at Break (%) |
|---|---|---|---|
| PEEK-PEDEK (unannealed) | Parallel/X | 62.3 | 8.2 |
| PEEK-PEDEK (annealed) | Parallel/X | 72.4 | 17 |
| PEEK-PEDEK (annealed) | Perpendicular/Y | 56.6 | 6.2 |
| Ultem (trade mark) 9085 | Parallel/X | 76.6 | 5.5 |
| Ultem (trade mark) 9085 | Perpendicular/Y | 37.1 | 3.2 |

As will be noted from Table 1, all of the PEEK-PEDEK test bars of the present invention exhibited better elongation at break properties than the comparative Ultem (trade mark) 9085 test bars. The annealed PEEK-PEDEK test bar printed with a parallel/X geometry had similar tensile strength characteristics to the corresponding Ultem (trade mark) 9085 test bar, but the elongation at break of the PEEK-PEDEK test bar was far superior. The annealed PEEK-PEDEK test bar printed with a perpendicular/Y geometry demonstrated far higher tensile strength and elongation at break characteristics than the corresponding Ultem (trade mark) 9085 test bar. In addition to the improved mechanical performance of the PEEK-PEDEK test bars in comparison with the Ultem (trade mark) 9085 test bars, the fact that semi-crystalline (e.g. 25-30% crystallinity) PEEK-PEDEK articles can be obtained means that such articles can exhibit excellent chemical resistance.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A fused filament fabrication process for manufacturing an object, the process comprising the following steps:
    a) selecting a feedstock material consisting of:
        i) a polymeric material (A) having a repeat unit of formula —O-Ph-O-Ph-CO-Ph-  I and a repeat unit of formula —O-Ph-Ph-O-Ph-CO-Ph 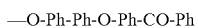 II wherein Ph represents a phenylene moiety; and
        ii) optionally one or more fillers;
    b) melting the feedstock material; and
    c) extruding the feedstock material to form a plurality of layers that define the object.

2. The process according to claim 1, wherein said repeat unit of formula I has the structure

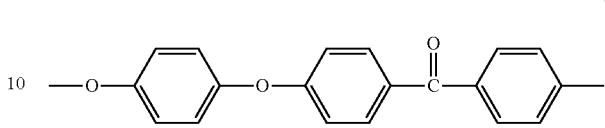 V and said repeat unit of formula II has the structure

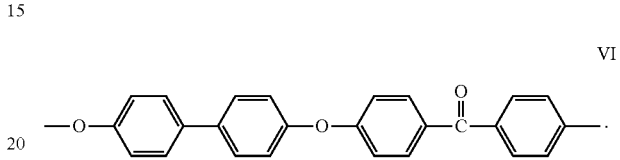 VI

3. The process according to claim 1, wherein the repeat units I and II are in the relative molar proportions I:II of from 50:50 to 95:5.

4. The process according to claim 1, wherein said polymeric material (A) includes at least 60 mol % of repeat units of formula I, and wherein said polymeric material (A) includes less than 90 mol % of repeat units of formula I, and/or wherein said polymeric material (A) has a melt viscosity (MV) of at least 0.15 kNsm$^{-2}$, and less than 0.8 kNsm$^{-2}$, wherein MV is measured using capillary rheometry operating at 340° C. at a shear rate of 1000 s$^{-1}$ using a tungsten carbide die, 0.5 mm×3.175 mm; and/or the Tm of said polymeric material (A) is less than 330° C., and greater than 280° C.

5. The process according to claim 1, wherein the feedstock material has a crystallinity of at least 5%, and less than 30%.

6. The process according to claim 1, wherein the plurality of layers that define the object comprises one or more layers that include one or more filler, wherein said plurality of layers comprises at least some layers in which the percentage weight of filler present in each layer is different, and optionally, wherein said plurality of layers that define the object comprises at least some layers in which the percentage weight of filler present in each layer varies gradually with each successive neighbouring layer.

7. The process according to claim 1, wherein, prior to step b), the feedstock material is fed into a printing head and the subsequent melting of the feedstock material in step b) occurs in said printing head.

8. The process according to claim 1, wherein the feedstock material is simultaneously or alternately extruded with one or more second material, and optionally, wherein the feedstock material and/or said second material are in the form of one or more filament prior to melting in step b), and optionally, wherein the feedstock material and said second material are in the form of separate filaments prior to melting in step b), and optionally, wherein the feedstock material and the second material are extruded from a nozzle.

9. The process according to claim 1, wherein the feedstock material is in the form of a filament prior to melting in step b), and wherein the filament of the feedstock material has been obtained by quenching a molten form of said filament of the feedstock material.

10. The process according to claim 1, wherein said feedstock material comprises one or more filler.

11. The process according to claim 10, wherein said filler includes one or more non-fibrous filler selected from mica, silica, talc, HydroxyApatite (or HydroxylApatite), alumina, kaolin, calcium sulfate, calcium carbonate, titanium oxide, titanium dioxide, zinc sulphide, ferrite, clay, glass powder, zinc oxide, nickel carbonate, iron oxide, quartz powder, magnesium carbonate, fluorocarbon resin, graphite, carbon powder, nanotubes and/or barium sulphate.

12. The process according to claim 10, wherein said filler includes one or more fibrous filler selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre.

13. An object manufactured by fused filament fabrication wherein said object consists of:
i) a polymeric material (A) having a repeat unit of formula —O-Ph-O-Ph-CO-Ph-  I and a repeat unit of formula —O-Ph-Ph-O-Ph-CO-Ph  II wherein Ph represents a phenylene moiety; and
ii) optionally one ore more fillers.

14. The object according to claim 13, wherein said object consists of the polymeric material (A) and one or more filler.

15. The object according to claim 14, wherein said filler includes one or more non-fibrous filler selected from mica, silica, talc, HydroxyApatite (or HydroxylApatite), alumina, kaolin, calcium sulfate, calcium carbonate, titanium oxide, titanium dioxide, zinc sulphide, ferrite, clay, glass powder, zinc oxide, nickel carbonate, iron oxide, quartz powder, magnesium carbonate, fluorocarbon resin, graphite, carbon powder, nanotubes and/or barium sulphate.

16. The object according to claim 14, wherein said filler includes one or more fibrous filler selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre.

17. A filament for use in a fused filament fabrication process to manufacture an object, the filament consisting of:
i) a polymeric material (A) having a repeat unit of formula —O-Ph-O-Ph-CO-Ph-  I and a repeat unit of formula —O-Ph-Ph-O-Ph-CO-Ph  II wherein Ph represents a phenylene moiety; and
ii) optionally one or more fillers.

18. The filament according to claim 17, wherein said filament consists of the polymeric material (A) and one or more filler.

19. The filament according to claim 18, wherein said filler includes one or more non-fibrous filler selected from mica, silica, talc, HydroxyApatite (or HydroxylApatite), alumina, kaolin, calcium sulfate, calcium carbonate, titanium oxide, titanium dioxide, zinc sulphide, ferrite, clay, glass powder, zinc oxide, nickel carbonate, iron oxide, quartz powder, magnesium carbonate, fluorocarbon resin, graphite, carbon powder, nanotubes and/or barium sulphate.

20. The filament according to claim 18, wherein said filler includes one or more fibrous filler selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre.

* * * * *